HIROSHI SHIBATA,
TERUO IMAI AND
SHIGEJI KUMAKI

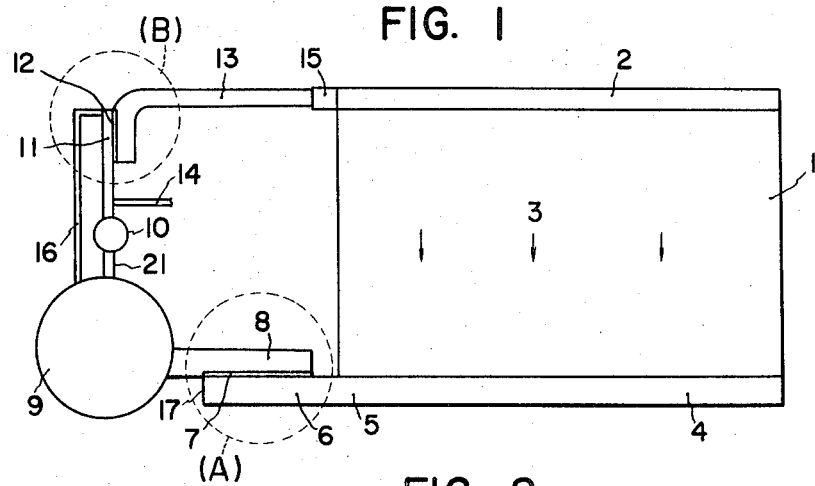
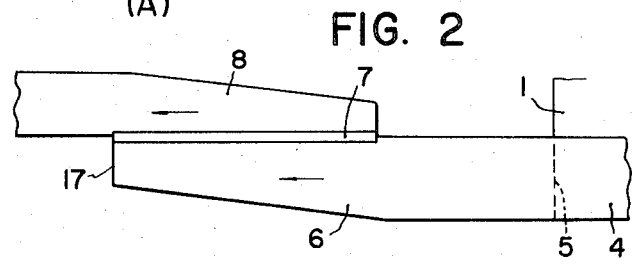
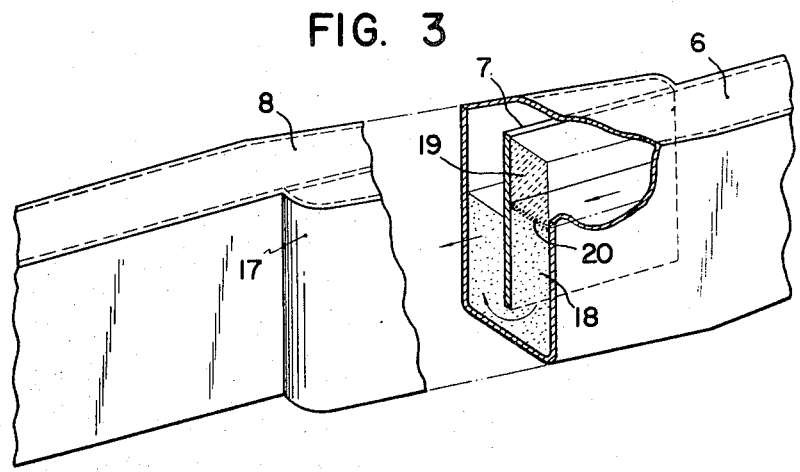
HIROSHI SHIBATA,
TERUO IMAI AND
SHIGEJI KUMAKI,
INVENTORS

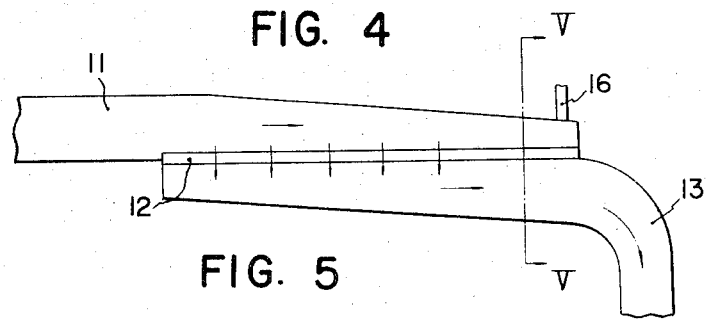
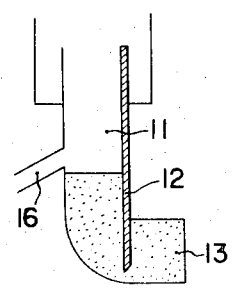
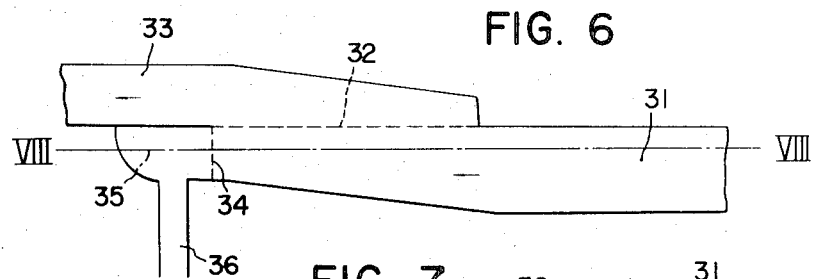
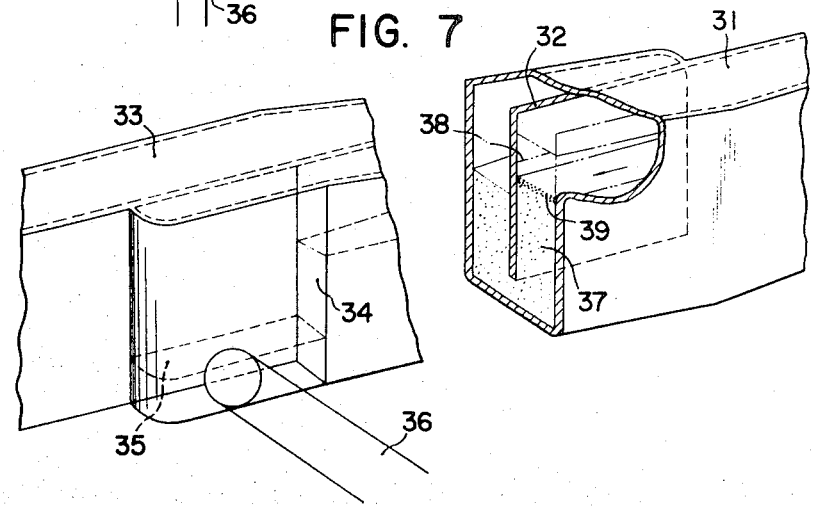

*INVENTORS*

3,630,876
MERCURY SEPARATION IN MERCURY PROCESS
ELECTROLYTIC APPARATUS
Hiroshi Shibata, Teruo Imai, and Shigeji Kumaki, Iwaki-shi, Japan, assignors to Kureha Kagaku Kogyo Kabushiki Kaisha, Tokyo-to, Japan
Filed Dec. 18, 1967, Ser. No. 691,413
Claims priority, application Japan, Dec. 27, 1966, 42/85,476; Apr. 5, 1967, 42/21,226
Int. Cl. C01d 1/08
U.S. Cl. 204—219                    5 Claims

ABSTRACT OF THE DISCLOSURE

A baffle plate with an outlet opening below its lower edge forms a partial side wall of a passageway through which mercury or mercury amalgam flows together with contaminants and a solution floating above it in a mercury process apparatus and only the mercury or amalgam is permitted to pass under and past the baffle into another passageway parallel to the first passageway, thereby being separated from the contaminants and solution, which are blocked by the baffle. The baffle along the side wall affords thorough separation without mixing due to turbulence of contaminants and solution with separated mercury or amalgam.

---

This invention relates generally to the mercury process (or amalgam process) for the production of chlorine and caustic soda and more particularly to a new and improved method and device for thoroughly separating mercury or mercury amalgam from contaminants, a solution, and other impurities existing thereabove in parts of the circulation system of a mercury process electrolytic apparatus.

In general, the mercury which has been denuded in the denuding tower in apparatus for alkaline electrolysis in the mercury process is pumped and recirculated to the electrolytic cell. In many cases, this mercury still contains a minute quantity of amalgam or carries on its surface substances such as broken particles of denuding graphite, iron rust, and other contaminants or caustic soda. Accordingly, it is ordinarily necessary to separate out thoroughly only the mercury at some point in the circulation flow path from the pump to electrolytic cell.

In some cases, furthermore, the mercury sent by the pump is further washed with water, the resulting wash water being used as make-up water for the denuding tower, and only the mercury is separated out and recirculated to the electrolytic cell.

In the electrolytic cell we have previously proposed and described in

U.S. patent application Ser. No. 581,695, filed Sept. 26, 1966, now abandoned, or U.S. patent application Ser. No. 533,585, filed Mar. 11, 1966, now U.S. Pat No. 3,400,067, the mercury which has been partly transformed into a sodium amalgam in the electrolytic chamber drops once into a long and narrow mercury passageway and flows therethrough at high velocity, and only mercury is separated out at the extreme end of this passageway and is sent to the denuding tower.

In this transfer of the mercury, it is necessary to separate the mercury thoroughly from contaminants such as pieces of graphite electrode which have broken off within the electrolytic chamber and mercury butter, which exist above the mercury, and from electrolyte existing thereabove. In each of these instances, the unseparated mercury flowing through a long and narrow flow passageway is continuosuly separated from the contaminants and solution floating thereabove. For this separation, heretofore, it has been a common practice to provide a baffle at the extreme downstream end of the unseparated mercury flow passageway perpendicularly to the mercury flow with the aim of causing only the mercury to pass under the baffle and thereby be separated. With a separating device of this type, however, it has been difficult for the following reasons to separate thoroughly mercury flowing through a narrow flow path.

Mercury in flowing motion has large kinetic energy even at points of relatively low flow velocities. When a baffle is placed perpendicularly across the path of this flowing mercury, the flow of the mercury advancing toward the baffle as though to collide thereagainst is changed in direction by a downward flow created in the vicinity of the baffle, but this mercury passes under and past the baffle while still retaining most of its original kinetic energy. This result is similar to that of a moving cannon ball having a large kinetic energy which is caused to change its direction of motion by a slight obstruction but continues to retain almost all of its energy.

Consequently, a substantial turbulence develops at the baffle surface and exerts a further drawing force on the mercury in the vicinity of the baffle. Furthermore, while the parts of the mercury which have impinged perpendicularly against the baffle are violently repulsed and give rise to wave motion, since the wettability with respect to mercury of insulating materials such as rubber and synthetic resins ordinarily used for baffles is very low, substances such as mercury butter and electrolytic solution, which readily wet the baffle, easily infiltrate between the baffle surface and the mercury and are swept along by the downward current along the baffle surface, thereby being discharged past the baffle.

Increasing the mercury depth at the baffle is not an effective solution to this problem. For example, according to the results of our experiments, the separation of mercury was not complete, and a considerable quantity of contaminants and solution was found to be floating on the surface of the mercury after the separation process even with a mercury depth of 50 cm. at a baffle of conventional type in the case when the mercury flow velocity through the approach passageway was 20 cm./sec.

Another measure which may at first appear to be a solution to the above described problem is that of expanding the downstream end of the flow passageway of the unseparated mercury to enlarge the transverse width of the baffle and thereby to reduce the flow velocity of the mercury flowing past the baffle. However, even when the downstream end of the flow of mercury approaching with a narrow width is widened, the velocity of the mercury which has approached in a narrow path is sustained with almost no change in the centre of the flow at the widened end since the momentum of the flowing mercury is large. For example, we have found that, even when the transverse width of the end of the approach passageway and of the baffle is increased to 10 times that of the approach passageway, there is almost no improvement in the mercury separation.

Because of the difficulty of thoroughly separating the mercury or amalgam as described above, the common general practice is to provide a water wash box for especially washing the mercury or amalgam after its passage past the baffle. These measures such as using a large mercury depth at the baffle, widening the mercury approach path to the baffle, and providing a water wash box increase the quantity of stagnant mercury and require a large quantity of high-price mercury, whereby such measures are not desirable.

It is an object of the present invention to overcome the above described difficulties associated with known methods and apparatus for mercury separation of the above described difficulties associated with known methods and apparatus for mercury separation of the above described character.

More specifically, an object of the invention is to provide a method and device for thoroughly separating mercury or mercury amalgam from contaminants and other impurities existing thereabove in parts of a mercury-process electrolytic apparatus.

Another object of the invention is to provide a device of the above stated character of simple and inexpensive organisation and operation.

According to the present invention, briefly summarised, there is provided a method for thoroughly separating mercury from contaminants and a liquid existing thereabove in an alkaline electrolytic apparatus for the merucury process, which method is characterised by the process of causing the mercury, contaminants, and the liquid to flow confluently and steadily through a passageway and causing only the mercury to pass under and past a baffle provided in a side wall of the passageway and having an opening thereunder and below the upper surface of the mercury and blocking passage of the contaminants and the liquid.

According to the present invention there is further provided a device for accomplishing the above stated method.

The nature, principle, details, and utility of the invention will be more clearly apparent from the following detailed description with respect to preferred embodiments of the invention when read in conjunction with the accompanying drawings, in which like parts are designated by like reference numerals.

In the drawings:

FIG. 1 is a diagrammatic plan view showing one example of a mercury-processs electrolytic apparatus provided with mercury separation devices embodying the invention;

FIG. 2 is a fragmentary plan view showing the details of the portion (A) in FIG. 1;

FIG. 3 is a fragmentary perspective view, with parts cut away and with certain parts shown in cross section, showing the portion illustrated in FIG. 2;

FIG. 4 is a fragmentary plan view showing the details of the portion (B) in FIG. 1;

FIG. 5 is a cross sectional view taken along the plane indicated by line V—V in FIG. 4 in the arrow direction;

FIG. 6 is a fragmentary plan view showing another example of a mercury separation device according to the invention;

FIG. 7 is a fragmentary perspective view, with parts cut away and with certain parts shown in cross section, showing details of the device illustrated in FIG. 6;

Figure 8:
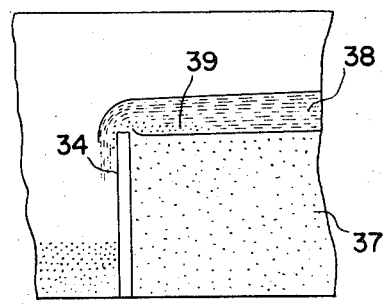
FIG. 8 is a vertical section taken along the plane indicated by line VIII—VIII in FIG. 6.

Referring to FIGS. 1 through 5 illustrating one example of embodiment of the invention, the amalgam process apparatus shown generally in FIG. 1 has an electrolytic cell vessel 1 provided with an electrolytic chamber 3 having an inlet space 2 along one side wall thereof. Mercury is introduced through a mercury inlet trough 15 and the inlet space 2 into the electrolytic chamber 3, where it flows in the direction indicated by arrows, one part of the mercury being transformed into a sodium amalgam (the resulting mercury and amalgam being referred to hereinafter merely as "amalgam").

This amalgam drops into a long and narrow passageway 4 and flows therealong in a direction perpendicular to the flow in the eletcrolytic chamber 3 to pass out of the vessel 1 through an outlet 5. At the same time, amalgam 18 and electrolyte 19 are flowing through an outer duct 6 outside of (downstream from) the vessel 1.

The unseparated amalgam which has flowed through the outer duct 6 passes under and past a baffle 7 formed as a part of a side wall of the duct and enters a separated mercury duct 8 disposed parallelly to the duct 6 in side-by-side, overlapping arrangement therewith at a connection between the two ducts. The baffle 7 thus forms a common, partial wall between the ducts 6 and 8 at the connection with a bottom opening and functions to block off the passage of contaminants 20 present at the surface of the amalgam 18 in the duct 6. The contaminants thus accumulating are removed from time to time by separate means.

The amalgam entering the duct 8 flows therethrough to enter a denuding tower 9, where it is denuded. The mercury 21 thus denuded is pumped by a pump 10 through a pump delivery duct 11, within which the mercury is washed with make-up water supplied through a pipe 14. The mercury thereafter passes under a second baffle 12 formed by a part of the common side wall between the downstream end of the duct 11 and a separated mercury duct 13 parallelly disposed thereto and connected thereto in side-by-side, overlapping arrangement. The mercury thereby enters the duct 13 and, flowing therethrough, returns to the mercury trough 15 at the inlet of the electrolytic cell vessel 1.

The second baffle 12 functions to separate the make-up water in the duct 11 from the mercury, and the water thus separated is passed through a pipe 16 and returned to the denuding tower 9, where it is further used as make-up water for the denuding process. Contaminants also separated and collected in the duct 11 are removed therefrom from time to time.

We have found that with the above described organisation of baffles and ducts, there is almost no drawing in of contaminants and other undesirable substances by the amalgam or mercury. Even with this organisation, however, the separating action cannot be said to be completely thorough in cases where the mercury or amalgam flow velocity is high.

That is, when the mercury separation devices illustrated in FIGS. 1 through 5 are used, complete mercury separation can be accomplished in the case where the mercury flow velocity within the ducts is relatively low, but when the mercury flow velocity becomes higher, the amalgam flowing through the passageway 4 and duct 6 collides against the end wall 17 at the downstream end of the duct 6 and thereby generates a wave motion. As a result, the amalgam is constantly agitated and mixed with the contaminants 20 and liquid 19 thereabove, and in some instances a part of the resulting mixture passes under and past the baffle 7 and, accompanying the amalgam, enters the duct 8 to the denuding tower 9.

We have found that the mercury separation at the baffles can be further improved by providing an overflow weir at the downstream ends of the ducts leading to the baffles shown in FIGS. 1 through 5. In one example of this provision as illustrated in FIGS. 6, 7, and 8, most of the mercury (or amalgam) 37 which flows, together with contaminants and wash water (or electrolyte), through a duct 31 leading to a mercury separation baffle 32 passes under and past the baffle and enters a duct 33, while contaminants 39 floating above the mercury and wash water 38, together with a small quantity of mercury, overflow over a dam or weir 34 and fall into an overflow mercury sump 35.

The duct 31 and weir 34 are so designed that this overflow is caused by the energy of the mercury flowing through the duct 31, and therefore the normal level of the mercury surface is slightly lower than the upper edge of the overflow weir 34. Because of this overflow, there is constantly a flow at the surface of the mercury toward the weir 34, which flow exerts a resisting influence counter to the drawing force which the mercury passing under the baffle 32 imparts to the contaminants and wash water (or electrolyte) on the surface thereof.

Furthermore, as shown in FIG. 8, only the lower part of the mercury collides against the weir 34, and a very thin layer of the upper part of the mercury is overflowing. Therefore, there is no mixing of the mercury with the contaminants and liquid due to wave motion arising from the collision of the mercury against the weir. Even if there is some mixing, the resulting mixture overflows over the weir 34 together with the surface flow. As a result of the above described operational effects, mixing of contaminants and other undesirable matter with the mercury passing under the baffle 32 and into the duct 33 is fully prevented.

The mercury, contaminants, and other matter which have overflowed into the overflow mercury sump 35 is removed by means as, for example, a drain pipe 36, and separated by any suitable device. Since the quantity of the mercury overflowing over the weir 34 is very small, the separation of this mercury is relatively easy and can be carried out in a simple known manner by a device such as a settling or sedimentation tank. In some cases, the mercury thus separated out can be caused to flow confluently with the mercury flowing through the duct 33 thereby to be recirculated to the denuding tower or electrolytic cell vessel.

The details and operational effectiveness of the mercury separation method and device of the present invention will now be considered more fully. Referring again to FIG. 2, the amalgam which has flowed through the passageway 4 and duct 6 strikes perpendicularly against the end wall 17 of duct 6, whereby the kineitc energy of the amalgam is completely dissipated (a part of the dynamic pressure being transformed into static pressure), and further flow of the amalgam under and past the baffle 7 is caused anew by the difference between the heads (static pressure) of the mercury in the ducts 6 and 8.

Consequently, this flow does not have an influence over a very long distance of the amalgam flow path, and the flow particularly upstream from the baffle 7 in the direction perpendicular thereto is very slow. Accordingly, complete separation of the amalgam can be carried out even when the depth of the amalgam at the baffle position is very shallow. Furthermore, since the baffle is provided in the side wall of the unseparated amalgam duct 6, it is possible to make the baffle width from a number of times to several tens of times the width of the duct 6. Therefore, the flow velocity of the amalgam flowing past the baffle becomes very low, but even then the quantity of amalgam remaining stagnant in the duct does not increase appreciably. It is possible to decrease further the quantity of amalgam in the region where the ducts 6 and 8 overlap by tapering the end of the duct 6 as shown in FIG. 2.

For example, it was found that when a baffle of a width of 60 cm. was provided for amalgam flowing at a velocity of 20 cm./sec. through an outer duct 6 of a width of 6 cm. at the electrolytic cell vessel, separation of the amalgam was thoroughly accomplished, and flow of contaminants and electrolyte to the denuding tower was not observable even when the depth of the amalgam within the duct 6 at the baffle surface was reduced to a value below 6 cm. Furthermore, it was possible to carry out mercury separation at the outlet of the pump 10 as shown in FIGS. 4 and 5 similarly in a thorough manner.

For higher flowrates (i.e., higher flow velocities) of the mercury (or amalgam), the mercury separation can be further improved by the use of the organization described hereinabove with reference to and as illustrated by FIGS. 6, 7 and 8.

Figure 9:
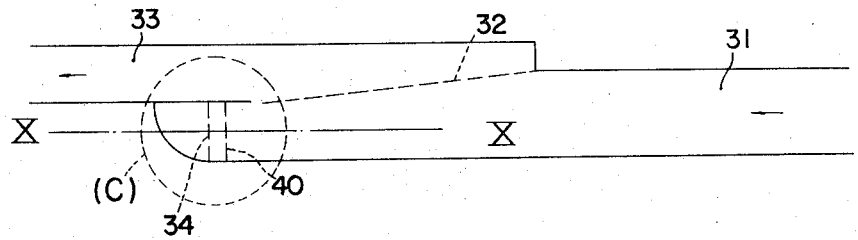
FIG. 9 is a fragmentary plan view of an example of a mercury separation device constituting still another embodiment of the invention.
Figure 10:
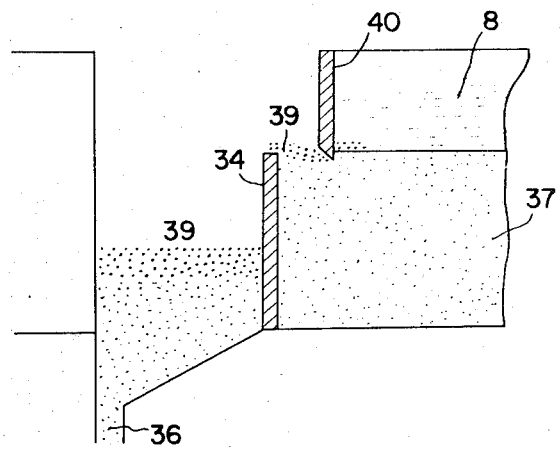
FIG. 10 is a fragmentary vertical section taken along the plane indicated by line X—X in portion (C) of FIG. 9.

While the baffle in the examples described above with reference to FIGS. 1 through 8 are parts of a side wall and are exactly parallel to the flow direction in the duct, it is not always necessary that the baffle be thus aligned. That is, the baffle may be aligned in an approximately parallel orientation relative to the flow direction as illustrated by baffle 32 in FIG. 9. In some cases, furthermore, it is also possible and effective to provide the arrangement shown in FIGS. 9 and 10 in which a baffle plate 40 for the electrolyte (or wash water) 38 is disposed upstream from and at a higher position than the overflow weir 34 thereby to form a barrier partition for stemming the liquid 38 and to permit only the mercury 37 and contaminants 39 to pass under and past this partition and then to overflow over the weir 34.

Furthermore, the planar shape of the electrolytic cell vessel to which the present invention can be applied is not limited to the special shape illustrated in FIG. 1 in which the width of the mercury flow path in the electrolytic chamber is greater than the length of the flow path. For example, the present invention can be applied effectively also to the separation of amalgam and mercury at the pump discharge side of a conventional electrolytic cell vessel of horizontal type of long dimension in the flow direction as illustrated in FIG. 11.

Figure 11:
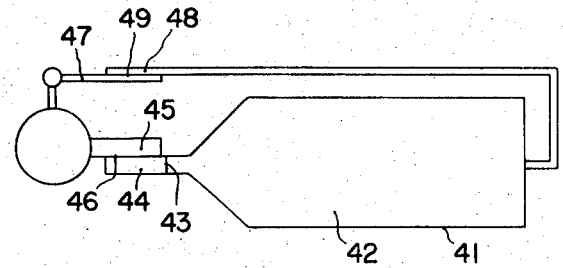
FIG. 11 is a diagrammatic plan view showing another example of a mercury process electrolytic apparatus in which mercury separation devices of the invention are installed.

More specifically, it has been the common practice, heretofore, to separate the amalgam flowing out of the electrolytic chamber 42 of an electrolytic cell vessel 41 as shown in FIG. 11 by means of a mercury baffle 43 at the outlet end of the electrolytic chamber. In recent years, however, there has been a trend toward higher electrical current density, which has caused an increase in the mercury flow velocity in the electrolytic chamber, and this increased velocity has given rise to difficulty in effectively accomplishing separation of the amalgam from the electrolyte and contaminants by means of a baffle such as a baffle 43 which is perpendicular to the amalgam flow direction.

We have found that, in such instances, by connecting a separated amalgam duct 45 parallelly to the outlet duct 44 of the electrolytic cell as shown in FIG. 11, either with or without the baffle 43, and providing a baffle 46 in the common side wall of the two ducts as described hereinbefore, it becomes possible to separate the amalgam thoroughly in the same manner as described before with respect to the electrolysis illustrated in FIGS. 1 through 3 without any mixing of electrolyte or contaminants with the separated amalgam. Furthermore, by installing similar separation ducts 47 and 48 in the flow path of the mercury denuded in the denuding tower and pumped by mercury pump toward the electrolytic head and providing a wall baffle 49 between the two ducts, thorough separation of the mercury can be accomplished in the same manner.

Figure 12:
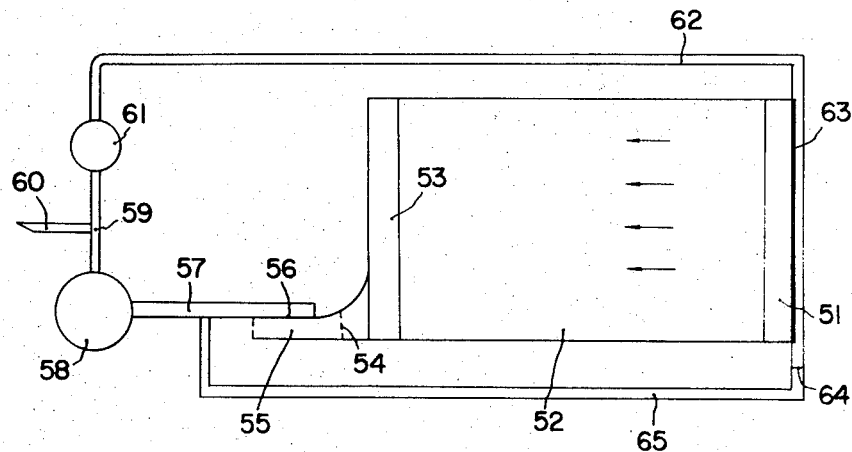
FIG. 12 is a diagrammatic plan view showing a further example of installation of devices of the invention in an electrolytic apparatus.

In a further example of application of the present invention as illustrated in FIG. 12, the mercury which has entered a mercury inlet passageway 51 of the electrolytic cell vessel flows across an electrolytic chamber 52 to become an amalgam, which falls into an outlet passageway 53 to flow perpendicularly to the mercury flow direction in the electrolytic chamber and, together with the electrolyte passes under and past a chlorine gas barrier baffle 54 to enter an outer duct 55.

A baffle 56 is provided in the side wall of the outer duct 55 whereby the amalgam is separated as described hereinbefore and enters a duct 57 to flow to a denuding tower 58 where it is denuded. The denuded mercury leaving the denuding tower 58 through a path 59 is confluently joined therein by wash water introduced through a pipe 60, and the confluent mercury and water are agitated within a mercury pump 61 where the mercury is washed and is then recirculated, together with the wash water, through a duct 62 to the head of the electrolytic cell vessel.

The mercury is here separated from the wash water by a baffle 63 extending over the entire side wall of the inlet passageway 51 of the vessel and enters the inlet passageway 51 to be used again in the salt electrolysis process in the electrolytic cell. The wash water left on the upstream side of the baffle 63 is separated by a weir 64 from contaminants and a small quantity of mercury and, passing through a path 65, enters the aforementioned amalgam duct 57. Thus, this wash water is sent together with the amalgam into the denuding tower 58 and is reused as denuding water.

Contaminants accumulating in a stagnant state on the upstream sides of the baffle 56 and weir 64 are removed as necessary. An advantageous feature of this electrolytic apparatus is that, not only is the separation of mercury accomplished thoroughly therein, but also, since the contaminants are removed at only the point upstream of the weir 64 and in the narrow duct 55, where chlorine is not given off, and the electrolytic cell vessel can be constantly kept tightly closed during operation, there is very little possibility of harmful chlorine being given off because of the removal of contaminants. Therefore, the working environment around the electrolytic apparatus is greatly improved.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention as set forth in the appended claims.

What we claim is:

1. In a chlorine-alkaline electrolytic apparatus for the mercury process, the combination thereof with at least one mercury separation device for thoroughly separating mercury from contaminants and a solution thereabove, said device comprising: a first passageway of a length substantially greater than the width thereof for confluent and steady flow therethrough of said mercury, contaminants, and solution, said first passageway being tapered so that the traverse width thereof decreases progressively toward the downstream end thereof; a second passageway connected parallelly and adjacently in side-by-side connection to said first passageway; and a baffle forming a common, partial side wall at said connection with an opening thereunder and below the upper surface level of the mercury and permitting passage of only the mercury from the first passageway, through said opening and into said second passageway but blocking passage of the contaminants and the solution.

2. In a chlorine-alkaline electrolytic apparatus for the mercury process, the combination thereof with at least one mercury separation device for thoroughly separating mercury from contaminants and a solution thereabove, said device comprising: a first passageway of a length substantially greater than the width thereof for confluent and steady flow therethrough of said mercury, contaminants, and solution; a second passageway connected parallelly and adjacently in side-by-side connection to said first passageway; a baffle forming a common, partial side wall at said connection with an opening thereunder and below the upper surface level of the mercury and permitting passage of most of the mercury, and only mercury, through said opening into said second passageway but blocking passage of the contaminants and the solution; an overflow weir provided at the extreme downstream end of the first passageway; and a baffle plate disposed upstream from and at a higher position than said overflow weir, the lower edge of said baffle plate being slightly below the upper surface of the mercury, and said baffle plate thereby operating to block the solution, but to permit only the mercury and contaminants to pass thereunder to the overflow weir.

3. In a chlorine-alkaline electrolytic apparatus for the mercury process and including an electrolytic cell with an inlet and an outlet, a denuding tower, a circulation pump, one mercury separation device installed in a flow path between the electrolytic cell outlet and the denuding tower, and another mercury separation device installed in a path between the circulation pump and the electrolytic cell inlet, said separation devices each comprising: a first passageway of a length substantially greater than the width thereof for confluent and steady flow therethrough of mercury, contaminants, and solution; a second passageway connected parallelly and adjacently in side-by-side connection to said first passageway; a baffle forming a common, partial side wall at said connection with an opening thereunder and below the upper surface level of the mercury and permitting passage of most of the mercury, and only mercury, through said opening into said second passageway but blocking passage of the contaminants and the solution; an overflow weir provided at the extreme downstream end of the first passageway; and a baffle plate disposed upstream from and at a higher position than said overflow weir, the lower edge of said baffle plate being slightly below the upper surface of the mercury and said baffle plate thereby operating to block the solution, but to permit only the contaminants and the mercury to pass thereunder to the overflow weir.

4. In a chlorine-alkaline electrolytic apparatus for the mercury process, the combination thereof with at least one mercury separation device for thoroughly separating mercury from contaminants and a solution thereabove, said device comprising: a first passageway of a length substantially greater than the width thereof for confluent and steady flow therethrough of said mercury, contaminants, and solution, said first passageway being tapered so that the traverse width thereof decreases progressively toward the downstream end thereof; a second passageway connected parallelly and adjacently in side-by-side connection to said first passageway; a baffle forming a common, partial side wall at said connection with an opening thereunder and below the upper surface level of the mercury and permitting passage of most of the mercury through said opening into said second passageway but blocking passage of the contaminants and the solution; and an overflow weir provided at the extreme downstream end of the first passageway and permitting the contaminants and the solution together with a small quantity of the mercury to overflow thereover.

5. In a chlorine-alkaline electrolytic apparatus for mercury processing, the combination comprising an electrolytic cell having an inlet and an outlet; a denuding tower; a circulation pump; a first mercury separation device installed in a flow path between said denuding tower and said outlet for thoroughly separating mercury from contaminants and a solution thereabove, said first mercury separation device comprising a first passageway in communication with said outlet and of a length substantially greater than the width thereof for confluent and steady flow therethrough of said mercury, contaminants, and solution, a second passageway connected parallelly and adjacently in side-by-side connection to said first passageway and in communication with said denuding tower, a baffle means forming a common, partial side wall at said connection with an opening thereunder and below the upper surface level of the mercury for permitting passage of most of the mercury, and only mercury, through said opening into said second passageway but blocking passage of the contaminants and the solution; and a second mercury separation device installed in a flow path between said circulation pump and said inlet for thoroughly separating mercury from contaminants and a solution thereabove, said second mercury separation device comprising a second passageway in communication with said circulation pump and of a length substantially greater than the width thereof for confluent and steady flow therethrough of said mercury, contaminants, and solution, said passageway connected parallelly and adjacently in side-by-side connection to said inlet, a baffle means forming a common, partial side wall at said connection with an opening thereunder and below the upper surface level of the mercury for permitting passage of most of the mercury, and only mercury, through said opening into said inlet but blocking passage of the contaminants and the solution, and an overflow weir means provided at the extreme downstream end of said first passageway for permitting the contaminants and the solution together with a small quantity of the mercury to overflow thereover.

References Cited

UNITED STATES PATENTS

| | | | |
|---|---|---|---|
| 790,922 | 5/1905 | Roepper et al. | 204—99 |
| 2,815,318 | 12/1957 | Shaw et al. | 204—99 |
| 2,872,393 | 2/1959 | Gardiner et al. | 204—99 |
| 3,091,579 | 5/1963 | Basilevsky | 204—99 |

TA-HSUNG TUNG, Primary Examiner

U.S. Cl. X.R.

204—99